(12) United States Patent
Shohraku et al.

(10) Patent No.: US 9,076,395 B2
(45) Date of Patent: Jul. 7, 2015

(54) LIQUID CRYSTAL DISPLAY DEVICE AND DISPLAY DEFECT CORRECTION METHOD

(75) Inventors: Akihiro Shohraku, Osaka (JP); Toshifumi Yagi, Osaka (JP); Masahiro Matsuda, Osaka (JP); Hidetoshi Nakagawa, Osaka (JP); Takuya Ohishi, Osaka (JP); Tomofumi Kubota, Osaka (JP); Kazushige Miyamoto, Osaka (JP); Haruhisa Suzuki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 54 days.

(21) Appl. No.: 13/700,508

(22) PCT Filed: Jun. 2, 2011

(86) PCT No.: PCT/JP2011/062671
§ 371 (c)(1),
(2), (4) Date: Nov. 28, 2012

(87) PCT Pub. No.: WO2011/152483
PCT Pub. Date: Dec. 8, 2011

(65) Prior Publication Data
US 2013/0070003 A1 Mar. 21, 2013

(30) Foreign Application Priority Data
Jun. 2, 2010 (JP) ................................ 2010-127297

(51) Int. Cl.
*G09G 3/36* (2006.01)
*G02F 1/1362* (2006.01)

(52) U.S. Cl.
CPC ............ *G09G 3/3607* (2013.01); *G09G 3/3648* (2013.01); *G09G 2300/0426* (2013.01);
(Continued)

(58) Field of Classification Search
CPC ................... G09G 3/2003; G09G 2300/0452; G09G 3/3607; G09G 2340/06; G09G 2310/0235; G09G 2320/0242; G09G 2300/0426; G09G 2320/0209; G09G 3/3614; G09G 3/3648; G09G 3/3688; G02F 2201/52; G02F 1/133514

USPC ........ 345/694, 209, 87–100, 690; 349/37, 54, 349/79–80, 97, 108, 138–139, 147, 149, 349/192
See application file for complete search history.

(56) References Cited

U.S. PATENT DOCUMENTS

| | | |
|---|---|---|
| 4,800,375 A | 1/1989 | Silverstein et al. |
| 7,268,757 B2 | 9/2007 | Ben-David et al. |

(Continued)

FOREIGN PATENT DOCUMENTS

| | | |
|---|---|---|
| JP | 09-251160 A | 9/1997 |
| JP | 11-295717 A | 10/1999 |

(Continued)

OTHER PUBLICATIONS

English translation of Official Communication issued in corresponding International Application PCT/JP2011/062671, mailed on Jan. 17, 2013.

(Continued)

*Primary Examiner* — Hong Zhou
(74) *Attorney, Agent, or Firm* — Keating & Bennett, LLP

(57) ABSTRACT

A liquid crystal display device (100) according to the present invention includes a plurality of pixels arrayed in a matrix, n number of the pixels (n is an even number of 4 or greater) being included in a color display pixel (CP). The liquid crystal display device includes an active matrix substrate (10) including a plurality of scanning lines (12) extending in a row direction and a plurality of signal lines (13) extending in a column direction; and a signal line driving circuit (3) that supplies, as a display signal, a gray scale voltage of a positive or negative polarity to each of the plurality of signal lines. The plurality of signal lines include a first type of signal line (13*a*) which does not intersect another signal line, and a second type of signal line (13*b*) which intersects a signal line adjacent thereto outside a display area in the state where an insulating film (16) is interposed therebetween. The active matrix substrate further includes a correction line (40) which is provided in the vicinity of an intersection region (IR) where the second type of signal line intersects the adjacent signal line, is electrically separated from the plurality of signal lines, and is at a floating potential.

13 Claims, 17 Drawing Sheets

(52) U.S. Cl.
CPC ...... *G09G2330/10* (2013.01); *G02F 1/136286* (2013.01); *G02F 2001/136272* (2013.01); *G09G 2330/12* (2013.01)

(56) References Cited

U.S. PATENT DOCUMENTS

| | | |
|---|---|---|
| 2004/0174389 A1* | 9/2004 | Ben-David et al. ........... 345/694 |
| 2005/0122294 A1 | 6/2005 | Ben-David et al. |
| 2008/0192165 A1* | 8/2008 | Nakagawa et al. ............. 349/55 |
| 2009/0040243 A1* | 2/2009 | Hisada et al. ................. 345/690 |
| 2009/0115708 A1* | 5/2009 | Sagawa et al. .................. 345/76 |
| 2009/0284679 A1* | 11/2009 | Kim et al. ....................... 349/54 |

FOREIGN PATENT DOCUMENTS

| | | |
|---|---|---|
| JP | 2001-209047 A | 8/2001 |
| JP | 2001-306023 A | 11/2001 |
| JP | 2004-529396 A | 9/2004 |
| WO | 2007/063620 A1 | 6/2007 |

OTHER PUBLICATIONS

Official Communication issued in International Patent Application No. PCT/JP2011/062671, mailed on Sep. 6, 2011.

Yang et al.; "31.1: Development of Six Primary-Color LCD"; Society for Information Display, 2005 International Symposium Digest of Technical Papers; vol. XXXVI, Book II; May 25-27, 2005; pp. 1210-1213.

Chino et al.; "25.1: Invited Paper: Development of Wide-Color-Gamut Mobile Displays With Four-Primary-Color LCDs"; Society for Information Display, 2006 International Symposium Digest of Technical Papers; vol. XXXVII, Book II; Jun. 7-9, 2006; pp. 1221-1224.

Ben-Chorin; "Improving LCD TV Color Using Multi-Primary Technology"; FPD International 2005 Forum; Oct. 19, 2005; Total of 66 pages.

* cited by examiner

FIG. 7
(a) 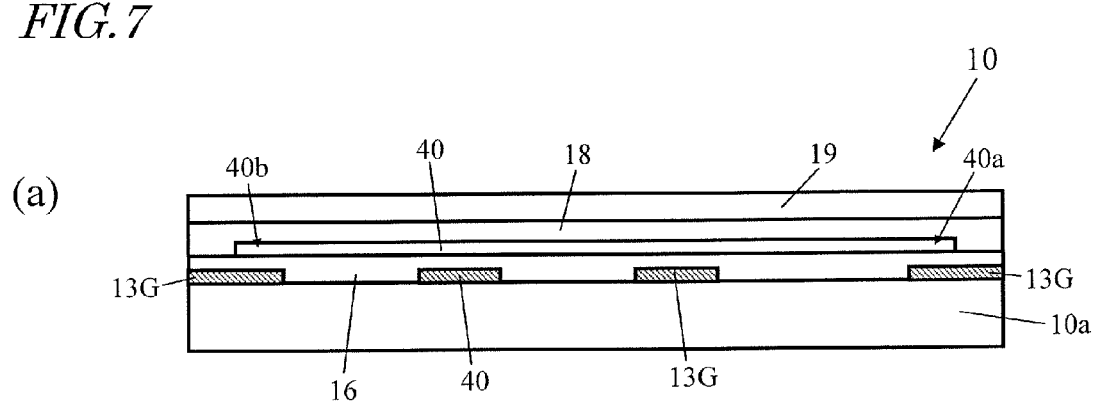
(b) 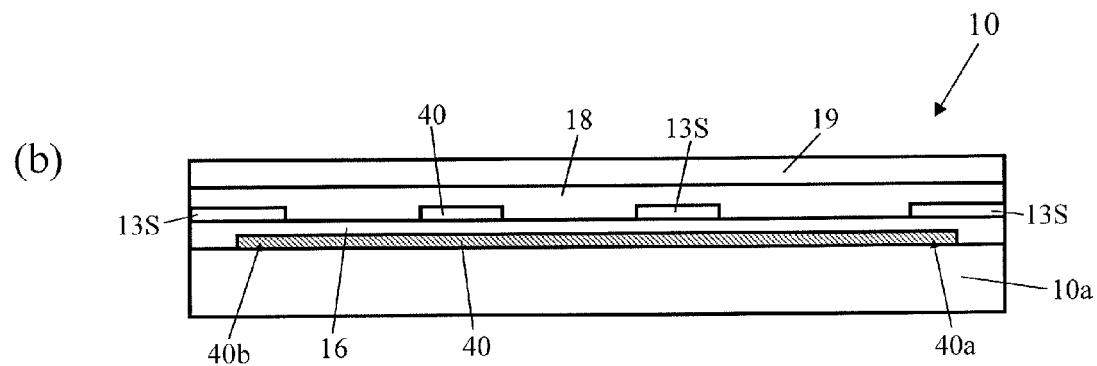

| R | G | B | W | R | G | B | W |
|---|---|---|---|---|---|---|---|
| R | G | B | W | R | G | B | W |

FIG.16

| R+ | G− | B+ | R− | G+ | B− | R+ | G− | B+ |
|----|----|----|----|----|----|----|----|----|
| R− | G+ | B− | R+ | G− | B+ | R− | G+ | B− |
| R+ | G− | B+ | R− | G+ | B− | R+ | G− | B+ |
| R− | G+ | B− | R+ | G− | B+ | R− | G+ | B− |
| R+ | G− | B+ | R− | G+ | B− | R+ | G− | B+ |
| R− | G+ | B− | R+ | G− | B+ | R− | G+ | B− |

FIG.17
PRIOR ART

| R + | G − | Y + | B − | R + | G − | Y + | B − | R + | G − | Y + | B − |
|---|---|---|---|---|---|---|---|---|---|---|---|
| R − | G + | Y − | B + | R − | G + | Y − | B + | R − | G + | Y − | B + |
| R + | G − | Y + | B − | R + | G − | Y + | B − | R + | G − | Y + | B − |
| R − | G + | Y − | B + | R − | G + | Y − | B + | R − | G + | Y − | B + |
| R + | G − | Y + | B − | R + | G − | Y + | B − | R + | G − | Y + | B − |
| R − | G + | Y − | B + | R − | G + | Y − | B + | R − | G + | Y − | B + |

FIG.18
PRIOR ART

| R + | G − | B + | W − | R + | G − | B + | W − | R + | G − | B + | W − |
|---|---|---|---|---|---|---|---|---|---|---|---|
| R − | G + | B − | W + | R − | G + | B − | W + | R − | G + | B − | W + |
| R + | G − | B + | W − | R + | G − | B + | W − | R + | G − | B + | W − |
| R − | G + | B − | W + | R − | G + | B − | W + | R − | G + | B − | W + |
| R + | G − | B + | W − | R + | G − | B + | W − | R + | G − | B + | W − |
| R − | G + | B − | W + | R − | G + | B − | W + | R − | G + | B − | W + |

FIG.19
(a) 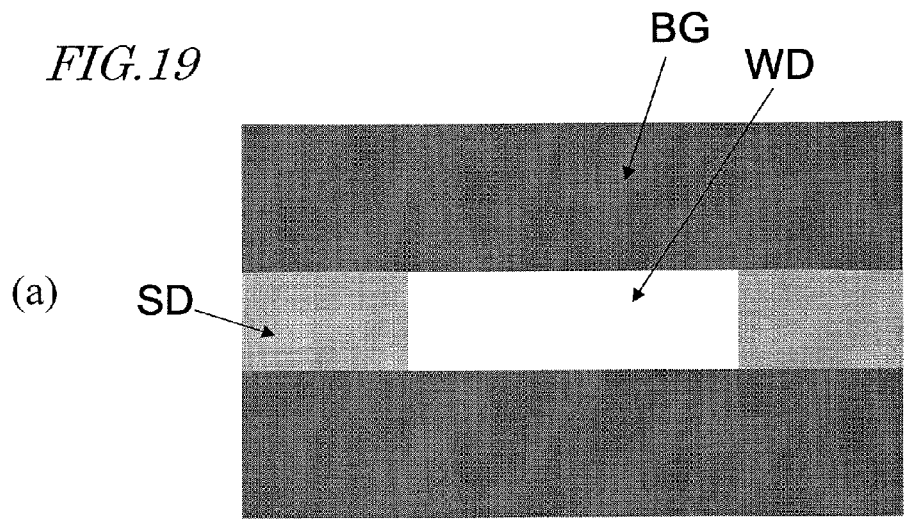
(b) 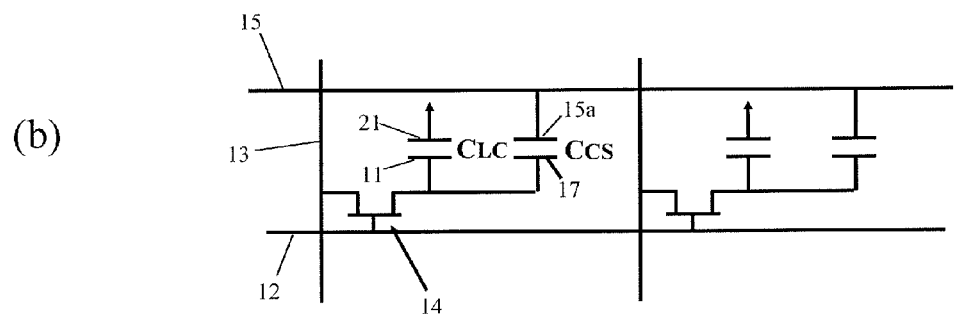
(c) (d) 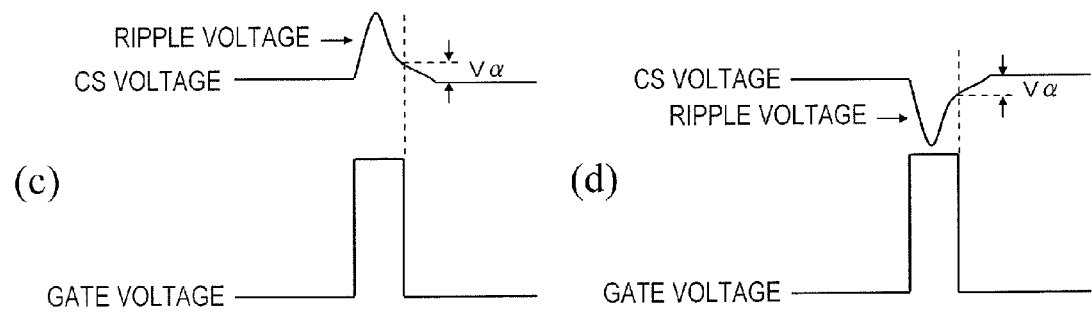

LIQUID CRYSTAL DISPLAY DEVICE AND DISPLAY DEFECT CORRECTION METHOD

TECHNICAL FIELD

The present invention relates to a liquid crystal display device, and specifically to a liquid crystal display device in which a color display pixel includes pixels of an even number of 4 or greater. The present invention also relates to a display fault correction method for correcting a display fault of such a liquid crystal display device.

BACKGROUND ART

Today, liquid crystal display devices are used for various applications. In a general liquid crystal display device, one color display pixel includes three pixels for displaying red, green and blue, which are three primary colors of light, and thus color display is provided.

However, a conventional liquid crystal display device has a problem that a range of colors which can be displayed (referred to as a "color reproduction range") is narrow. In order to broaden the color reproduction range of a liquid crystal display device, a technique of increasing the number of primary colors used for display has been proposed.

For example, Patent Document 1 discloses, as shown in FIG. 14, a liquid crystal display device 800 in which one color display pixel CP includes four pixels which are a red pixel R for display red, a green pixel G for displaying green, a blue pixel B for displaying blue, and a yellow pixel Y for displaying yellow. In the liquid crystal display device 800, color display is provided by mixing the four primary colors of red, green, blue and yellow displayed by the four pixels R, G, B and Y.

When display is provided by use of four or more primary colors, the color reproduction range can be broadened as compared with the range realized by the conventional liquid crystal display device which provides display by use of three primary colors. In this specification, a liquid crystal display device which provides display by use of four or more primary colors will be referred to as a "multiple primary color liquid crystal display device", and a liquid crystal display device which provides display by use of three primary colors will be referred to as a "three primary color liquid crystal display device".

Patent Document 2 discloses, as shown in FIG. 15, a liquid crystal display device 900 in which one color display pixel CP includes four pixels which are a red pixel R, a green pixel G, a blue pixel B, and a white pixel W for displaying white. In the liquid crystal display device 900, the color reproduction range cannot be broadened because the added pixel is the white pixel W, but the display luminance can be raised.

However, when the liquid crystal display device 800 shown in FIG. 14 or the liquid crystal display device 900 shown in FIG. 15, in which one color display pixel CP includes an even number of pixels, is driven by dot inversion driving, a phenomenon called "horizontal shadow" occurs, which reduces the display quality. Dot inversion driving is a technique for suppressing generation of display flicker. By dot inversion driving, the polarity of the applied voltage is inverted pixel by pixel.

FIG. 16 shows a polarity of a voltage applied to each pixel in the case where a three primary color liquid crystal display device is driven by dot inversion driving. FIG. 17 and FIG. 18 respectively show a polarity of a voltage applied to each pixel in the case where the liquid crystal display devices 800 and 900 are driven by dot inversion driving.

As shown in FIG. 16, in the three primary color liquid crystal display device, the polarities of the voltages applied to the pixels of the same color are inverted in a row direction. For example, in the first, third and fifth pixel rows in FIG. 16, the polarities of the voltages applied to the red pixels R are positive (+), negative (−) and positive (+) from left to right. The polarities of the voltages applied to the green pixels G are negative (−), positive (+) and negative (−) from left to right. The polarities of the voltages applied to the blue pixels B are positive (+), negative (−) and positive (+) from left to right.

By contrast, in the liquid crystal display devices 800 and 900, one color display pixel CP includes even number of (four) pixels. Therefore, as shown in FIG. 17 and FIG. 18, the polarities of all the voltages applied to the pixels of the same color in each pixel row are the same. For example, in the first, third and fifth pixel rows in FIG. 17, the polarities of the voltages applied to the red pixels R and the yellow pixels Y are all positive (+). The polarities of the voltages applied to the green pixels G and the blue pixels B are all negative (−). In the first, third and fifth pixel rows in FIG. 18, the polarities of the voltages applied to the red pixels R and the blue pixels B are all positive (+). The polarities of the voltages applied to the green pixels G and the white pixels W are all negative (−).

In the case where the polarities of all the voltages applied to the pixels of the same color arrayed in the row direction are the same, when a window pattern is displayed with a single color, a horizontal shadow is generated. Hereinafter, a cause of the horizontal shadow will be described with reference to FIG. 19.

As shown in FIG. 19(a), when a high luminance window WD is displayed with a single color so as to be surrounded by a low luminance background BG, a horizontal shadow SD having a higher luminance than that of the display which would be provided in a proper state may be generated to the right and to the left of the window WD.

FIG. 19(b) is an equivalent circuit of an area corresponding to two pixels in a general liquid crystal display device. As shown in FIG. 19(b), each of the pixels includes a thin film transistor (TFT) 14. A gate electrode, a source electrode and a drain electrode of the TFT 14 are electrically connected to a scanning line 12, a signal line 13 and a pixel electrode 11, respectively.

The pixel electrode 11, a counter electrode 21 provided so as to face the pixel electrode 11, and a liquid crystal layer located between the pixel electrode 11 and the counter electrode 21 form a liquid crystal capacitance $C_{LC}$. A storage capacitance electrode 17 electrically connected to the pixel electrode 11, a storage capacitance counter electrode 15a provided so as to face the storage capacitance electrode 17, and a dielectric layer (insulating film) located between the storage capacitance electrode 17 and the storage capacitance counter electrode 15a form a storage capacitance $C_{cs}$.

The storage capacitance counter electrode 15a is electrically connected to a storage capacitance line 15, and is supplied with a storage capacitance counter voltage (CS voltage). FIG. 19(c) and FIG. 19(d) show changes of the CS voltage and the gate voltage in accordance with the time passage. In FIG. 19(c) and FIG. 19(d), the polarity of a write voltage (gray scale voltage to be supplied to the pixel electrode 11 via the signal line 13) is different from each other.

When the gate voltage is put into an ON state and thus the pixel starts to be charged, the potential of the pixel electrode 11 (drain voltage) is changed. At this point, as shown in FIG. 19(c) and FIG. 19(d), a ripple voltage is superimposed on the CS voltage via a parasitic capacitance between the drain and the CS. As can be seen from a comparison between FIG. 19(c)

and FIG. 19(d), the polarity of the ripple voltage is inverted in accordance with the polarity of the write voltage.

The ripple voltage superimposed on the CS voltage is attenuated as time passes. In the case where the amplitude of the write voltage is small, namely, in a pixel for displaying the background BG, when the gate voltage is put into an OFF state, the ripple voltage becomes almost zero. By contrast, in the case where the amplitude of the write voltage is large, namely, in a pixel for displaying the window WD, the ripple voltage is higher than that of the pixel for displaying the background BG. Therefore, as shown in FIG. 19(c) and FIG. 19(d), when the gate voltage is put into an OFF state, the ripple voltage superimposed on the CS voltage is not attenuated sufficiently. Even after the gate voltage is put into an OFF state, the ripple voltage is kept on attenuated. Therefore, the drain voltage (pixel electrode potential), which is influenced by the CS voltage, is diverged from the level that the drain voltage is to have, due to the remaining ripple voltage $V\alpha$.

In the same pixel row, the ripple voltages having opposite polarities act to counteract each other. However, the ripple voltages having the same polarity are superimposed on each other. Therefore, as shown in FIG. 17 and FIG. 18, in the case where the polarities of all the voltages applied to the pixels of the same color in the same pixel row are the same, when the window pattern is displayed with a single color, a horizontal shadow is generated.

Patent Document 3 discloses a technology for preventing the generation of the horizontal shadow. FIG. 20 shows a liquid crystal display device 1000 disclosed in Patent Document 3.

As shown in FIG. 20, the liquid crystal display device 1000 includes a liquid crystal display panel 1001 including color display pixels CP each including a red pixel R, a green pixel G, a blue pixel B and a white pixel W, and a source driver 1003 for supplying a display signal to a plurality of signal lines 1013 provided in the liquid crystal display panel 1001.

The source driver 1003 includes a plurality of independent drivers 1003a which correspond to the plurality of signal lines 1013 in a one-to-one manner. The plurality of independent drivers 1003a are arrayed in a row direction, and two independent drivers 1003a adjacent to each other output gray scale voltages of opposite polarities to each other.

In the liquid crystal display device 1000 shown in FIG. 20, the arraying order of a part of the signal lines 13 is inverted outside a display area. For example, the fifth signal line 1013 and the sixth signal line 1013 from the left in the figure are provided to intersect each other outside the display area in the state where an insulating film is interposed therebetween. As a result, the fifth signal line 1013 is connected to the sixth independent driver 1003a, and the sixth signal line 1013 is connected to the fifth independent driver 1003a. Owing to such a structure, in the liquid crystal display device 1000, the pixels of the same color in the two color display pixels CP adjacent to each other in the row direction are supplied with gray scale voltages of opposite polarities to each other. For this reason, the polarities of the voltages applied to the pixels of the same color arrayed in the row direction are not the same, and thus the generation of a horizontal shadow can be prevented.

CITATION LIST

Patent Literature

Patent Document 1: Japanese PCT National-Phase Laid-Open Patent Publication No. 2004-529396

Patent Document 2: Japanese Laid-Open Patent Publication No. 11-295717

Patent Document 3: International Publication No. 2007/063620

SUMMARY OF INVENTION

Technical Problem

However, in the case where the structure disclosed in Patent Document 3 is adopted, in a region where the signal lines intersect each other, the signal lines are shortcircuited to each other. A signal line shortcircuited to another signal line cannot supply a display signal which would be supplied in a proper state to the corresponding pixel. This causes a display fault, and thus the yield is reduced.

The present invention made in light of the above-described problem has an object of, in a liquid crystal display device in which a color display pixel includes pixels of an even number of 4 or greater, preventing the generation of a horizontal shadow and also suppressing the reduction of the yield.

Solution to Problem

A liquid crystal display device according to the present invention includes a plurality of pixels arrayed in a matrix including a plurality of rows and a plurality of columns, n number of the pixels (n is an even number of 4 or greater) being included in each of color display pixels. The liquid crystal display device includes an active matrix substrate including a plurality of scanning lines extending in a row direction and a plurality of signal lines extending in a column direction; and a signal line driving circuit that supplies, as a display signal, a gray scale voltage of a positive or negative polarity to each of the plurality of signal lines. The n number of pixels are arrayed in p rows by q columns (p is an integer of 1 or greater, and q is an even number of n or smaller) in each of the color display pixels; the plurality of signal lines include a first type of signal line which does not intersect another signal line, and a second type of signal line which intersects a signal line adjacent thereto outside a display area in a state where an insulating film is interposed therebetween; and the active matrix substrate further includes a correction line which is provided in the vicinity of an intersection region where the second type of signal line intersects the adjacent signal line, is electrically separated from the plurality of signal lines, and is at a floating potential.

In a preferable embodiment, the correction line is provided so as to partially overlap the second type of signal line as seen in a direction normal to the substrate.

In a preferable embodiment, the correction line is formed of a conductive film same as that of a part of the plurality of scanning lines which is located in the display area or formed of a conductive film same as that of a part of the plurality of signal lines which is located in the display area.

In a preferable embodiment, the active matrix substrate further includes a marker that points to the correction line.

In a preferable embodiment, the active matrix substrate includes a thin film transistor provided in each of the plurality of pixels; and the marker is formed of the conductive film same as that of the part of the plurality of scanning lines which is located in the display area, formed of the conductive film same as that of the part of the plurality of signal lines which is located in the display area, or formed of a semiconductor film same as that of a semiconductor layer of the thin film transistor.

In a preferable embodiment, the n number of pixels included in one of any two color display pixels adjacent to each other in the row direction are each supplied with a gray scale voltage via the first type of signal line, and the n number of pixels included in the other of the any two color display pixels are each supplied with a gray scale voltage via the second type of signal line.

In a preferable embodiment, the plurality of pixels are arrayed such that the q number of pixels, among the n number of pixels included in the color display pixels arrayed in the row direction, are repeated in the same order.

In a preferable embodiment, the signal line driving circuit includes a plurality of output terminals arrayed in the row direction; and any two output terminals adjacent to each other, among the plurality of output terminals, output gray scale voltages of opposite polarities to each other.

In a preferable embodiment, in any two color display pixels adjacent to each other in the row direction, the pixels for displaying the same color are supplied with gray scale voltages of opposite polarities to each other via the signal lines corresponding thereto.

In a preferable embodiment, any two pixels adjacent to each other in the row direction in each of the color display pixels are supplied with gray scale voltages of opposite polarities to each other via the signal lines corresponding thereto.

In a preferable embodiment, the n number of pixels included in each of the color display pixels display different colors from each other.

In a preferable embodiment, the n number of pixels included in each of the color display pixels include a red pixel for displaying red, a green pixel for displaying green, a blue pixel for displaying blue, and a yellow pixel for displaying yellow.

A display fault correction method according to the present invention is for correcting a display fault in the above-described liquid crystal display device. The method includes step (A) of specifying, from the plurality of signal lines, the second type of signal line shortcircuited to a signal line adjacent thereto in the intersection region; and step (B) of forming a bypass circuit by use of the correction line such that a display signal to be supplied to the specified second type of signal line bypasses the intersection region.

In a preferable embodiment, the step (B) includes step (B1) of cutting the specified second type of signal line at a position upstream with respect to the intersection region and a position downstream with respect to the intersection region; and step (B2) of connecting a part of the specified second type of signal line and one of two ends of the correction line to each other, and connecting another part of the specified second type of signal line and the other of the two ends of the correction line to each other.

In a preferable embodiment, the step (B1) and the step (B2) are performed by laser light radiation.

Advantageous Effects of Invention

According to the present invention, in a liquid crystal display device in which a color display pixel includes pixels of an even number of 4 or greater, the generation of a horizontal shadow can be prevented and also the reduction of the yield can be suppressed.

BRIEF DESCRIPTION OF DRAWINGS

FIGS. 7(a) and (b) each show a cross-sectional structure of the active matrix substrate 10, and are respectively cross-sectional views taken along lines 7A-7A' and 7B-7B' in FIG. 5.

FIG. 15 schematically shows a conventional liquid crystal display device 900.

FIG. 16 shows a polarity of a voltage applied to each pixel in the case where a three primary color liquid crystal display device is driven by dot inversion driving.

FIG. 17 shows a polarity of a voltage applied to each pixel in the case where the conventional liquid crystal display device 800 is driven by dot inversion driving.

FIG. 18 shows a polarity of a voltage applied to each pixel in the case where the conventional liquid crystal display device 900 is driven by dot inversion driving.

FIGS. 19(a) through (d) are provided to explain a reason why a horizontal shadow is generated.

DESCRIPTION OF EMBODIMENTS

Hereinafter, embodiments of the present invention will be described with reference to the drawings. The present invention is not limited to the following embodiments.

Figure 1:
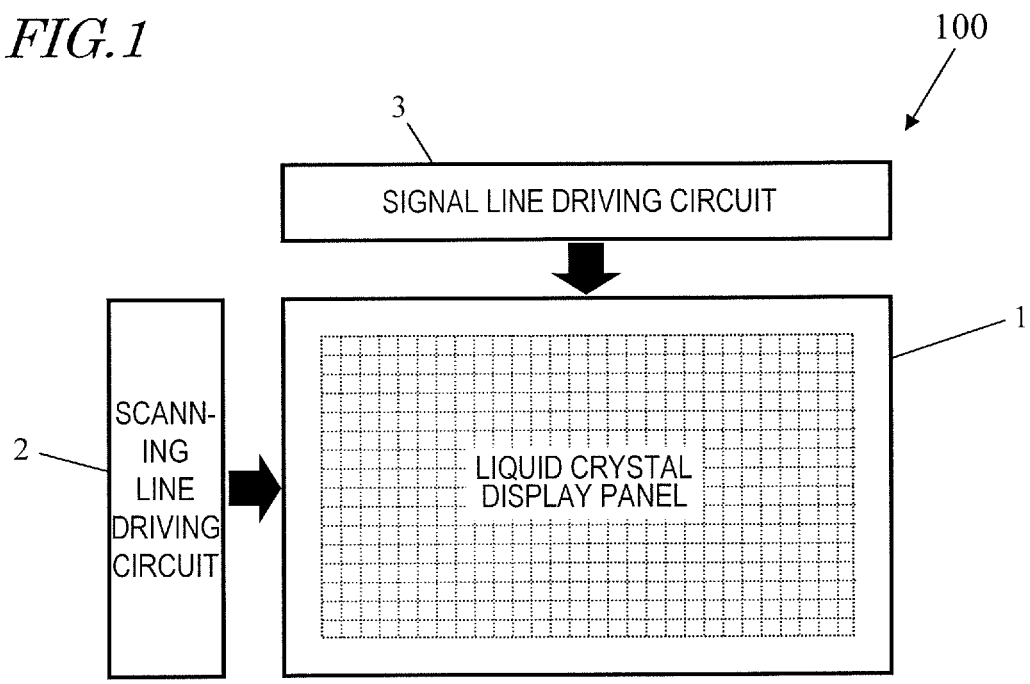
FIG. 1 schematically shows a liquid crystal display device 100 in a preferable embodiment according to the present invention.

FIG. 1 shows a liquid crystal display device 100 in this embodiment. As shown in FIG. 1, the liquid crystal display device 100 includes a liquid crystal display panel 1 including a plurality of pixels arrayed in a matrix including a plurality of rows and a plurality of columns, a scanning line driving circuit (gate driver) 2 and a signal line driving circuit (source driver) 3 that supply a driving signal to the liquid crystal display panel 1.

Figure 2:
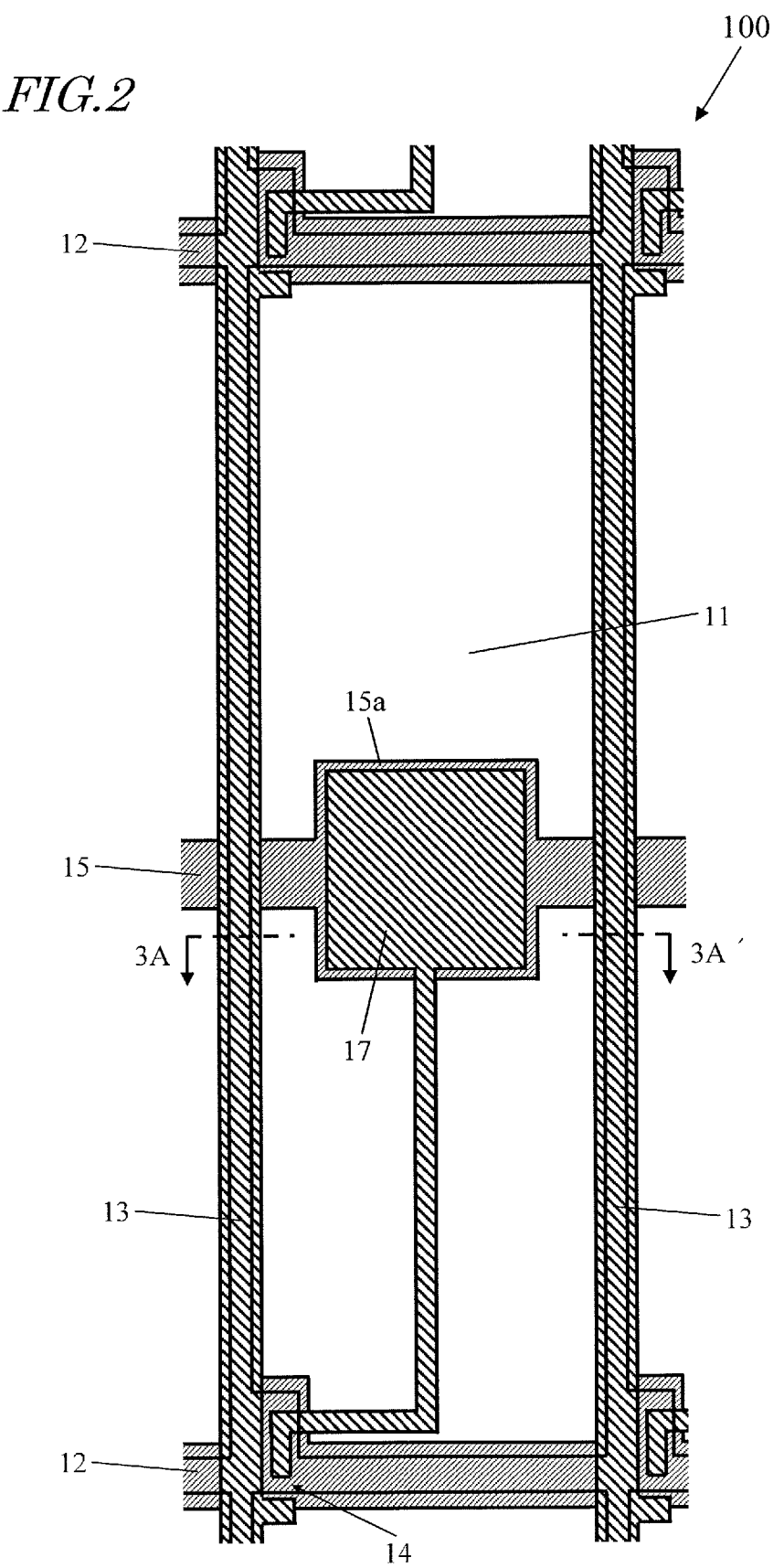
FIG. 2 schematically shows the liquid crystal display device 100 in a preferable embodiment according to the present invention and is a plan view showing an area corresponding to one pixel.
Figure 3:
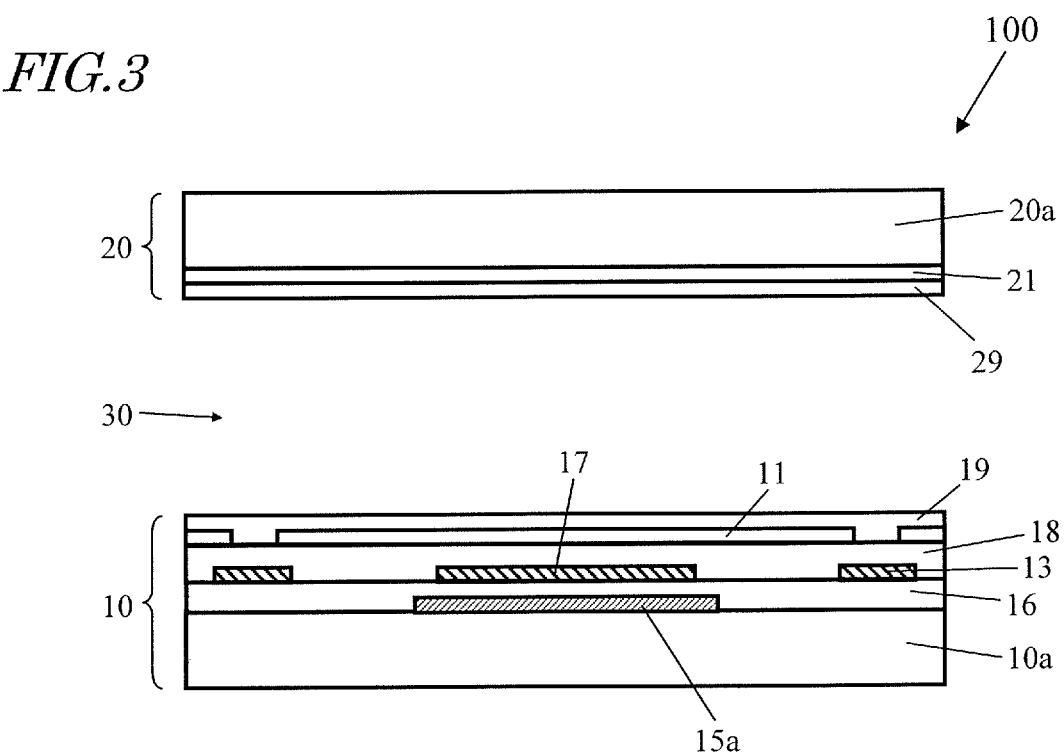
FIG. 3 schematically shows the liquid crystal display device 100 in a preferable embodiment according to the present invention and is a cross-sectional view taken along line 3A-3A' in FIG. 2.

FIG. 2 and FIG. 3 show a specific structure of the liquid crystal display panel 1. FIG. 2 is a plan view showing an area corresponding to one pixel of the liquid crystal display panel 1. FIG. 3 is a cross-sectional view taken along line 3A-3A' in FIG. 2.

The liquid crystal display panel 1 includes an active matrix substrate 10, a counter substrate 20 facing the active matrix substrate 10, and a liquid crystal layer 30 provided between the active matrix substrate 10 and the counter substrate 20.

The active matrix substrate 10 includes a pixel electrode 11 provided in each of the plurality of pixels, a plurality of scanning lines 12 extending in a row direction, and a plurality of signal lines 13 extending in a column direction. The pixel electrode 11 is supplied with a scanning signal from a corresponding scanning line 12 and with a display signal from a corresponding signal line 13, both via a thin film transistor (TFT) 14 provided in each pixel.

The scanning lines 12 are provided on an insulating transparent substrate (e.g., glass substrate) 10a. On the transparent substrate 10a, storage capacitance lines 15 extending in the row direction are also provided. The storage capacitance lines 15 are formed of a conductive film same as that of the scanning lines 12. A part 15a of each storage capacitance line 15 which is located in the vicinity of the center of the pixel is wider than the remaining part of the storage capacitance line 15 and acts as a storage capacitance counter electrode. The storage capacitance counter electrode 15a is supplied with a storage capacitance counter voltage (CS voltage) from the storage capacitance line 15.

A gate insulating film 16 is provided so as to cover the scanning lines 12 and the storage capacitance lines 15. On the gate insulating film 16, the signal lines 13 are provided. On the gate insulating film 16, storage capacitance electrodes 17 are also provided. The storage capacitance electrodes 17 are formed of a conductive film same as that of the signal lines 13. The storage capacitance electrodes 17 are each electrically connected to a drain electrode of the corresponding TFT 14, and are each supplied with the same voltage as that of the pixel electrode 11 via the TFT 14.

An interlayer insulating film 18 is provided so as to cover the signal lines 13 and the storage capacitance electrodes 17. On the interlayer insulating film 18, the pixel electrodes 11 are provided.

On an outermost surface of the active matrix substrate 10 (outermost surface on the side of the liquid crystal layer 30), an alignment film 19 is provided. As the alignment film 19, a horizontal alignment film or a vertical alignment film is provided in accordance with the display mode.

The counter substrate 20 includes a counter electrode 21 facing the pixel electrodes 11. The counter electrode 21 is provided on an insulating transparent substrate (e.g., glass substrate) 20a. On an outermost surface of the counter substrate 20 (outermost surface on the side of the liquid crystal layer 30), an alignment film 29 is provided. As the alignment film 29, a horizontal alignment film or a vertical alignment film is provided in accordance with the display mode. Although not shown here, the counter substrate 20 typically further includes a color filter layer and a light blocking layer (black matrix).

The liquid crystal layer 30 contains liquid crystal molecules (not shown) having positive or negative dielectric anisotropy in accordance with the display mode, and further contains a chiral agent when necessary.

In the liquid crystal display panel 1 having the above-described structure, each pixel electrode 11, the counter electrode 21 facing the pixel electrode 11, and the liquid crystal layer 30 located between the pixel electrode 11 and the counter electrode 21 form a liquid crystal capacitance $C_{LC}$. Each storage capacitance electrode 17, the storage capacitance counter electrode 15a facing the storage capacitance electrode 17, and the gate insulating film 16 located between the storage capacitance electrode 17 and the storage capacitance counter electrode 15a form a storage capacitance $C_{cs}$. The liquid crystal capacitance $C_{LC}$ and the storage capacitance $C_{cs}$ provided parallel to the liquid crystal capacitance $C_{LC}$ form a pixel capacitance Cpix.

The scanning line driving circuit 2 supplies a scanning signal to each of the plurality of scanning lines 12 of the liquid crystal display panel 1. Meanwhile, the signal line driving circuit 3 supplies, as a display signal, a gray scale voltage of a positive or negative polarity to each of the plurality of signal lines 13 of the liquid crystal display panel 1.

Hereinafter, with reference to FIG. 4, the relationship between the manner of arraying the plurality of pixels included in the liquid crystal display panel 1 and the polarity of the gray scale voltage to be supplied to each pixel from the signal line driving circuit 3 via the signal line 13 will be described. The polarity of the gray scale voltage is determined based on the voltage to be supplied to the counter electrode 21 (counter voltage).

Figure 4:
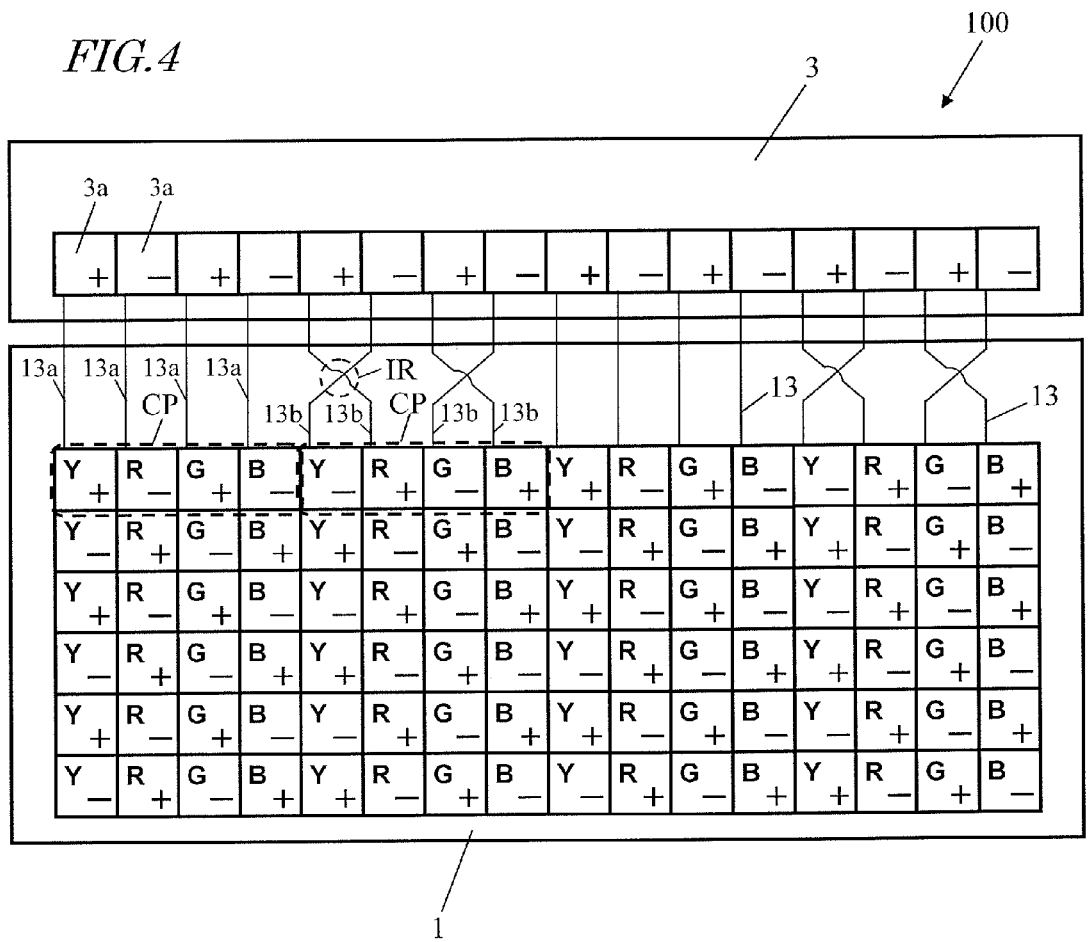
FIG. 4 schematically shows a liquid crystal display panel 1 and a signal line driving circuit 3 included in the liquid crystal display device 100.

As shown in FIG. 4, the plurality of pixels include red pixels R for displaying red, green pixels G for displaying green, blue pixels B for displaying blue, and yellow pixels Y for displaying yellow. Namely, the plurality of pixels of the liquid crystal display panel 1 each include four types of pixels for displaying different colors from each other. The color filter layer of the counter substrate 20 includes red color filters for transmitting red light, green color filters for transmitting green light, blue color filters for transmitting blue light and yellow color filters for transmitting yellow color in correspondence with the red pixels R, the green pixels G, the blue pixels B and the yellow pixels Y.

The plurality of pixels are arrayed such that the four types of pixels are repeated in the same order in the row direction. Specifically, the plurality of pixels are arrayed cyclically in the order of the yellow pixel Y, the red pixel R, the green pixel G and the blue pixel B from left to right. The four pixels continuous in the row direction (yellow pixel Y, red pixel R, green pixel G and blue pixel B) form a color display pixel CP, which is the minimum unit for providing color display. In other words, the four pixels are arrayed in one row by four columns in the color display pixel CP.

FIG. 4 shows the polarity of the gray scale voltage to be supplied to each pixel in a certain vertical scanning period. As shown in FIG. 4, any two pixels adjacent to each other in the row direction in one color display pixel CP are supplied with gray scale voltages of opposite polarities to each other via the corresponding signal lines 13. Any two pixels adjacent to each other in the column direction are also supplied with gray scale voltages of opposite polarities to each other via the corresponding signal line 13.

As described above, in the liquid crystal display device 100, the polarities of the gray scale voltages are inverted pixel by pixel in the column direction. In the row direction also, the polarities of the gray scale voltages are inverted pixel by pixel in each color display pixel CP. In this manner, the liquid crystal display device 100 is driven by inversion driving close to dot inversion driving.

Also in the liquid crystal display device 100, as shown in FIG. 4, in any two color display pixels CP adjacent to each other in the row direction, the pixels for displaying the same color are supplied with gray scale voltages of opposite polarities to each other via the corresponding signal lines 13. For example, in the uppermost pixel row in FIG. 4, in the leftmost color display pixel CP, the yellow pixel Y and the green pixel G are each supplied with a gray scale voltage of the positive polarity, and the red pixel R and the blue pixel B are each supplied with a gray scale voltage of the negative polarity. By contrast, in the second color display pixel CP from the left in the same pixel row, the yellow pixel Y and the green pixel G are each supplied with a gray scale voltage of the negative polarity, and the red pixel R and the blue pixel B are each supplied with a gray scale voltage of the positive polarity. Therefore, the polarities of the voltages applied to the pixels of the same color arrayed in the row direction are not the same, and thus the generation of a horizontal shadow can be prevented.

The above-described inversion driving (inversion driving which can prevent the generation of a horizontal shadow) can be realized by connecting the plurality of signal lines 13 to the signal line driving circuit 3 in the manner shown in FIG. 4. Hereinafter, the plurality of signal lines 13 will be referred to as the "first signal line 13", the "second signal line 13", the "third signal line 13", . . . sequentially from the left in the figure. Similarly, a plurality of output terminals 3a described later will be referred to as the "first output terminal 3a", the "second output terminal 3a", the "third output terminal 3a", . . . sequentially from the left in the figure.

The signal line driving circuit 3 includes a plurality of output terminals 3a arrayed in the row direction. Any two output terminals 3a adjacent to each other, among the plurality of output terminals 3a, output gray scale voltages of opposite polarities to each other. The plurality of output terminals 3a of the signal line driving circuit 3 and the plurality of signal lines 13 of the liquid crystal display panel 1 are connected in a one-by-one manner.

In the liquid crystal display device 100 in this embodiment, the plurality of signal lines 13 of the liquid crystal display panel 1 include two types of signal lines. Specifically, as shown in FIG. 4, the plurality of signal lines 13 of the liquid crystal display panel 1 include a first type of signal lines 13a which do not intersect another signal line 13, and a second type of signal lines 13b which intersect the signal lines 13 adjacent thereto outside a display area in the state where an insulating film (in this example, gate insulating film 16 as described later) is interposed therebetween. In the example shown in FIG. 4, the first through fourth and the ninth through 12th signal lines 13 are the first type of signal lines 13a, and the fifth through eighth and the 13th through 16th signal lines 13 are the second type of signal lines 13b.

The first type of signal lines 13a do not intersect another signal line 13. Therefore, the first type of signal lines 13a and the output terminals 3a are connected in accordance with the order. Namely, the i'th signal line 13 (i is a natural number), which is the first type of signal line 13a, is connected to the i'th output terminal 3a. For example, referring to FIG. 4, the first signal line 13 is connected to the first output terminal 3a, and the second signal line 13 is connected to the second output terminal 3a. The third signal line 13 is connected to the third output terminal 3a, and the fourth signal line 13 is connected to the fourth output terminal 3a.

By contrast, the second type signal lines 13 intersect the signal lines 13 adjacent thereto. Therefore, the second type of signal lines 13b and the output terminals 3a are not connected in accordance with the order, and the order of connection is reversed. Namely, the j'th signal line (j is a natural number different from i), which is the second type of signal line 13b, is connected to the (j+1)th output terminal 3a, and the (j+1)th signal line 13, which is the second type of signal line 13b, is connected to the j'th output terminal 3a. For example, referring to FIG. 4, the fifth signal line 13 is connected to the sixth output terminal 3a, and the sixth signal line 13 is connected to the fifth output terminal 3a. The seventh signal line 13 is connected to the eighth output terminal 3a, and the eighth signal line 13 is connected to the seventh output terminal 3a.

n number of pixels included in one of any two color display pixels CP adjacent to each other in the row direction are each supplied with a gray scale voltage via the first type of signal line 13a. By contrast, n number of pixels included in the other color display pixel CP are each supplied with a gray scale voltage via the second type of signal line 13b. Accordingly, in the case where the polarities of the gray scale voltages to be supplied to the pixels in one of the two color display pixels CP are positive, negative, positive and negative sequentially from the left, the polarities of the gray scale voltages to be supplied to the pixels in the other color display pixel CP are negative, positive, negative and positive sequentially from the left. Therefore, in any two color display pixels CP adjacent to each other in the row direction, the pixels for displaying the same color can be supplied with gray scale voltages of opposite polarities to each other.

As described above, by providing two types of signal lines 13a and 13b, inversion driving which can prevent the generation of a horizontal shadow can be realized. However, in the case where such a structure is adopted, in regions where the second type of signal lines 13b intersect the signal lines 13b adjacent thereto (hereinafter, referred to as "intersection regions") IR, the signal lines 13 (second type of signal lines 13b) may be shortcircuited to each other.

Figure 5:
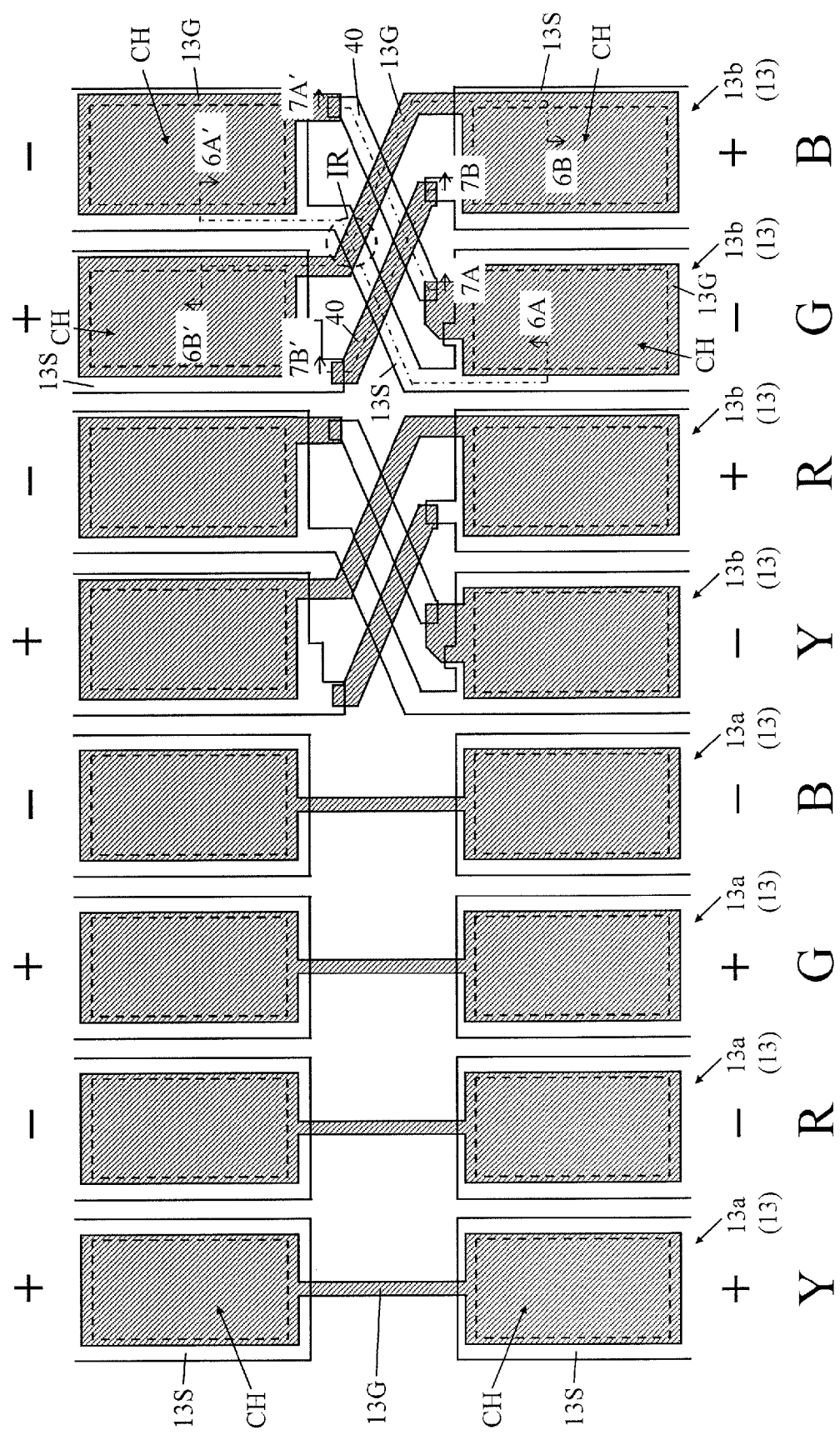
FIG. 5 is a plan view showing a part of the plurality of signal lines 13 included in an active matrix substrate 10 in the liquid crystal display panel 1, the part being located outside a display area.
Figure 6:
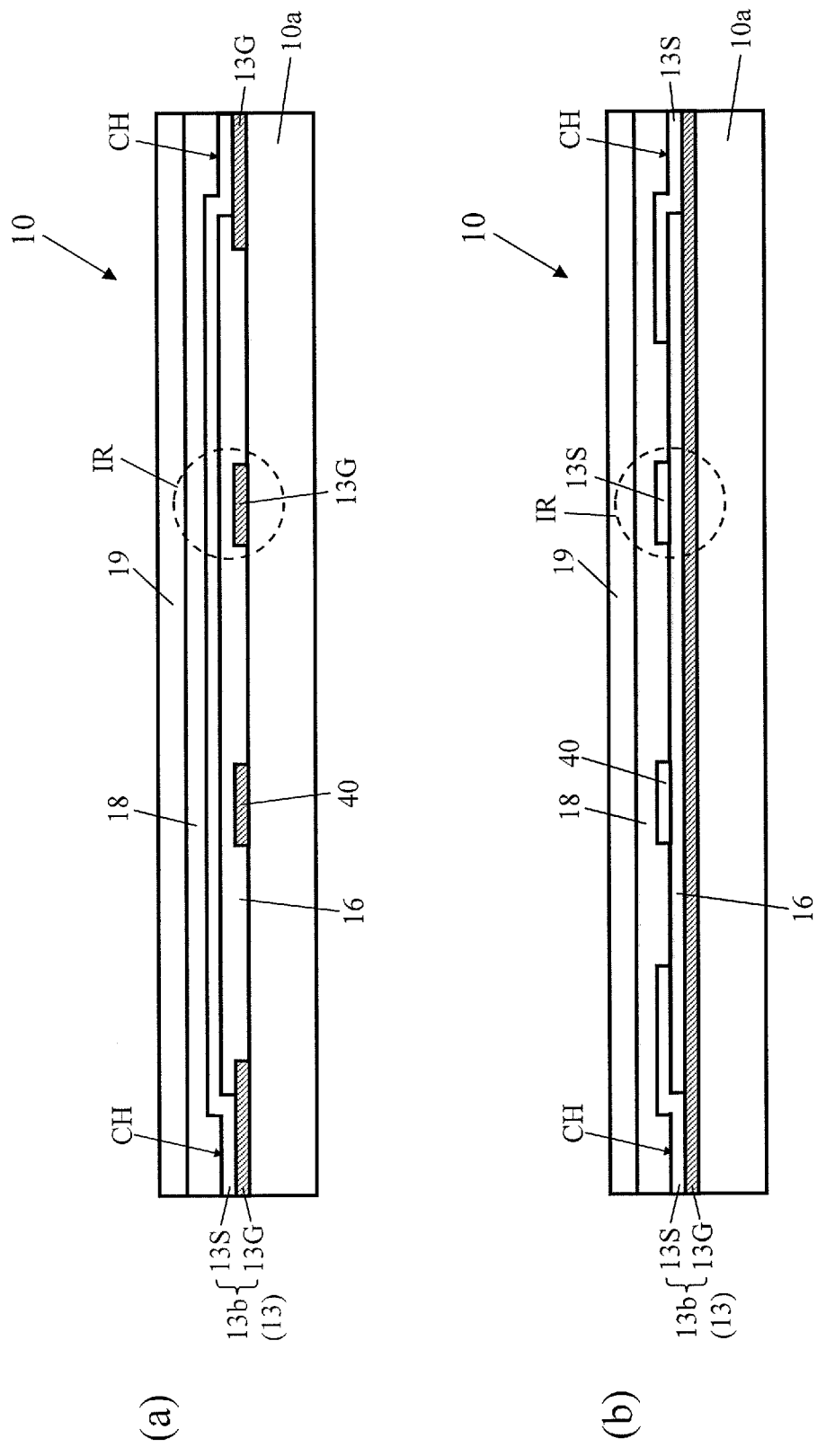
FIGS. 6(a) and (b) each show a cross-sectional structure of the active matrix substrate 10, and are respectively cross-sectional views taken along lines 6A-6A' and 6B-6B' in FIG. 5.

The liquid crystal display device 100 in this embodiment has a structure which can correct a display fault caused by the shortcircuiting of the signal lines 13 to each other (this structure is not shown in FIG. 4). Hereinafter, this structure will be described specifically described with reference to FIG. 5, FIG. 6 and FIG. 7. FIG. 5, FIG. 6 and FIG. 7 show a part of the plurality of signal lines 13 included in the active matrix substrate 10, the part being located outside the display area (defined by the plurality of pixels). FIG. 5 is a plan view showing eight signal lines 13 among the plurality of signal lines 13. FIG. 6(a) and FIG. 6(b) each show a cross-sectional structure of the active matrix substrate 10. FIG. 6(a) is a cross-sectional view taken along line 6A-6A' in FIG. 5, and FIG. 6(b) is a cross-sectional view taken along line 6B-6B' in FIG. 5. FIG. 7(a) and FIG. 7(b) each show a cross-sectional structure of the active matrix substrate 10. FIG. 7(a) is a cross-sectional view taken along line 7A-7A' in FIG. 5, and FIG. 7(b) is a cross-sectional view taken along line 7B-7B' in FIG. 5.

In the region shown in FIG. 5 (region outside the display area), the signal lines 13 have a layer structure different from that of the display area. A conductive layer forming the scanning lines 12 in the display area (wiring line layer provided below the gate insulating film 16) is referred to as a "gate metal layer", and a conductive layer forming the signal lines 13 in the display area (wiring line layer provided above the gate insulating film 16) is referred to as a "source metal layer". As shown in FIG. 5, outside the display area, each signal line 13 includes a lower layer line 13G formed of the gate metal layer and an upper layer line 13S formed of the source metal layer. The lower layer line 13G and the upper layer line 13S are connected to each other via a contact hole CH formed in the gate insulating film 16 at each of a position upstream with respect to the intersection region IR and a position downstream with respect to the intersection region IR.

As shown in FIG. 5, regarding the first through fourth signal lines 13, which are the first type of signal lines 13, the upper layer line 13S is not continuous between the upstream side and the downstream side. The upper layer line 13S on the upstream side and the upper layer line 13S on the downstream side are electrically connected to each other via the lower layer line 13G.

As shown in FIGS. 5 and 6(a), regarding the fifth and seventh signal lines 13 among the fifth through eighth signal lines 13, which are the second type of signal lines 13b, the upper layer line 13S is continuous between the upstream side and the downstream side. By contrast, as shown in FIG. 5 and FIG. 6(b), regarding the sixth and eighth signal lines 13, the upper layer line 13S is not continuous between the upstream side and the downstream side. The upper layer line 13S on the upstream side and the upper layer line 13S on the downstream side are electrically connected to each other via the lower layer line 13G. As shown in FIG. 5, FIG. 6(a) and FIG. 6(b), the upper layer line 13S of the seventh signal line 13 and the lower layer line 13G of the eighth signal line 13 intersect each other in the intersection region IR in the state where the gate insulating film 16 is interposed therebetween. Similarly, the upper layer line 13S of the fifth signal line 13 and the lower layer line 13G of the sixth signal line 13 intersect each other in the intersection region IR in the state where the gate insulating film 16 is interposed therebetween.

As shown in FIG. 5, the active matrix substrate 10 in this embodiment includes correction lines 40 in the vicinity of the intersection regions IR where the second type of signal lines 13b intersect the signal lines 13 adjacent thereto. The correction lines 40 are electrically separated from any of the signal lines 13 and are at a floating potential. The correction lines 40 are each provided in correspondence with each of the second type of signal lines 13b included in the active matrix substrate 10. Namely, one correction line 40 is provided for one second type of signal line 13b. The correction line 40 is provided so as to partially overlap the corresponding signal line 13 (second type of signal line 13b) as seen in a direction normal to the substrate.

The correction lines 40 for the fifth and seventh signal lines 13 are formed of the source metal layer. Namely, these correction lines 40 are formed of the same conductive film as that of the part of the signal lines 13 which is located in the display area. As shown in FIG. 7(a), the correction line 40 for the seventh signal line 13 is provided such that one end 40a thereof overlaps the lower layer line 13G on the upstream side in the state where the gate insulating film 16 is interposed therebetween, and such that the other end 40b thereof overlaps the lower layer line 13G on the downstream side in the state where the gate insulating film 16 is interposed therebetween. Similarly, the correction line 40 for the fifth signal line 13 is also provided such that one end 40a thereof overlaps the lower layer line 13G on the upstream side in the state where the gate insulating film 16 is interposed therebetween, and such that the other end 40b thereof overlaps the lower layer line 13G on the downstream side in the state where the gate insulating film 16 is interposed therebetween.

The correction lines 40 for the sixth and eighth signal lines 13 are formed of the gate metal layer. Namely, these correction lines 40 are formed of the same conductive film as that of the part of the scanning lines 13 which is located in the display area. As shown in FIG. 7(b), the correction line 40 for the eighth signal line 13 is provided such that one end 40a thereof overlaps the upper layer line 13S on the upstream side in the state where the gate insulating film 16 is interposed therebetween, and such that the other end 40b thereof overlaps the upper layer line 13S on the downstream side in the state where the gate insulating film 16 is interposed therebetween. Similarly, the correction line 40 for the sixth signal line 13 is also provided such that one end 40a thereof overlaps the upper layer line 13S on the upstream side in the state where the gate insulating film 16 is interposed therebetween, and such that the other end 40b thereof overlaps the upper layer line 13S on the downstream side in the state where the gate insulating film 16 is interposed therebetween.

In the liquid crystal display device 100 in this embodiment, the correction lines 40 as described above are provided. Therefore, even in the case where the signal lines 13 are shortcircuited to each other in an intersection region IR and thus a display fault occurs, the display fault can be corrected by use of such a correction line 40. Hereinafter, a method for correcting a display fault by use of the correction line 40 will be specifically described.

First, among the plurality of signal lines 13, a second type of signal line 13b which is shortcircuited to the signal line 13 adjacent thereto in the intersection region IR are specified. For example, the liquid crystal display device 100 is operated to provide display, and a pixel column exhibiting a display fault is specified visually (e.g., by use of a loupe). As a result, the signal line 13 for supplying a display signal to the pixel row exhibiting the display fault is specified as the second type of signal line 13b which is shortcircuited.

Figure 8:
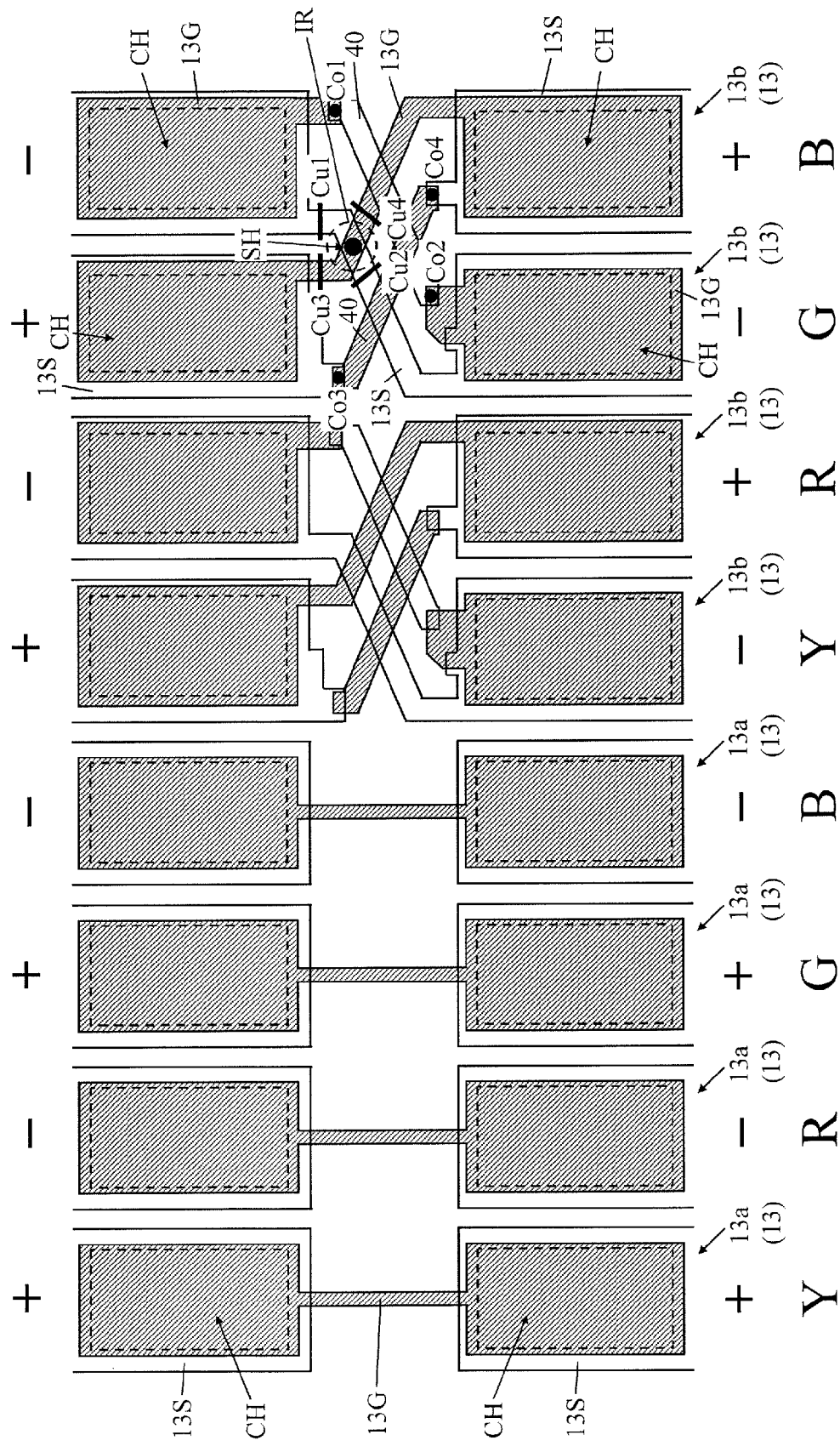
FIG. 8 is a plan view showing a part of the plurality of signal lines 13 included in the active matrix substrate 10, the part being located outside the display area.

Next, a bypass circuit is formed by use of the correction line 40 such that the display signal to be supplied to the specified second type of signal line 13b bypasses the intersection region IR. Now, with reference to FIG. 8, this step will be described more specifically. FIG. 8 shows a case where shortcircuiting SH occurs in the intersection region IR of the seventh signal line 13 and the eighth signal line 13 (both are the second type of signal lines 13b).

First, the specified second type of signal lines 13b are each cut at a position upstream with respect to the intersection region IR and at a position downstream with respect to the intersection region IR. In this example, regarding the seventh signal line 13, the upper layer line 13S is cut at two positions interposing the intersection region IR (cut positions Cu1 and Cu2). As a result, the seventh signal line 13 is electrically separated from the part where the shortcircuiting occurs. Regarding the eighth signal line 13, the lower layer line 13G is cut at two positions having the intersection region IR therebetween (cut positions Cu3 and Cu4). As a result, the eighth signal line 13 is electrically separated from the part where the shortcircuiting occurs.

Next, a part of each of the specified second type of signal lines 13b and one end 40a of the corresponding correction line 40 are connected to each other, and another part of each of the specified second type of signal lines 13b and the other end 40b of the corresponding correction line 40 are connected to each other. In this example, regarding the correction line 40 for the seventh signal line 13, one end 40a thereof is connected to the lower layer line 13G on the upstream side (connection part Co1) and the other end 40b thereof is connected to the lower layer line 13G on the downstream side (connection part Co2). As a result, the seventh signal line 13 is bridged by the correction line 40. Regarding the correction line 40 for the eighth signal line 13, one end 40a thereof is connected to the upper layer line 13S on the upstream side (connection part Co3) and the other end 40b thereof is connected to the upper layer line 13S on the downstream side (connection part Co4). As a result, the eighth signal line 13 is bridged by the correction line 40.

The cutting of the signal lines 13, and the connection of the signal line 13 and the correction line 14, may be performed by, for example, laser light radiation. In the above description, the signal line 13 is cut and then the signal line 13 and the correction line 40 are connected to each other. The order of the cutting step and the connection step is not limited to this. The connection step may be performed first and followed by the cutting step.

By performing the cutting step and the connection step as described above, the correction line 40 acts as a bypass circuit for transmitting a display signal such that the display signal bypasses the intersection region IR. Therefore, the pixel columns corresponding to the signal lines 13 which are shortcircuited can be supplied with gray scale voltages which are to be supplied in a proper state.

In this manner, in the liquid crystal display device 100 in this embodiment, even if the signal lines 13 are shortcircuited to each other in the intersection region IR, the display fault caused by the shortcircuiting can be corrected. Therefore, the reduction of the yield can be suppressed.

Now, more preferable structures of the liquid crystal display device 100 will be described.

Figure 9:
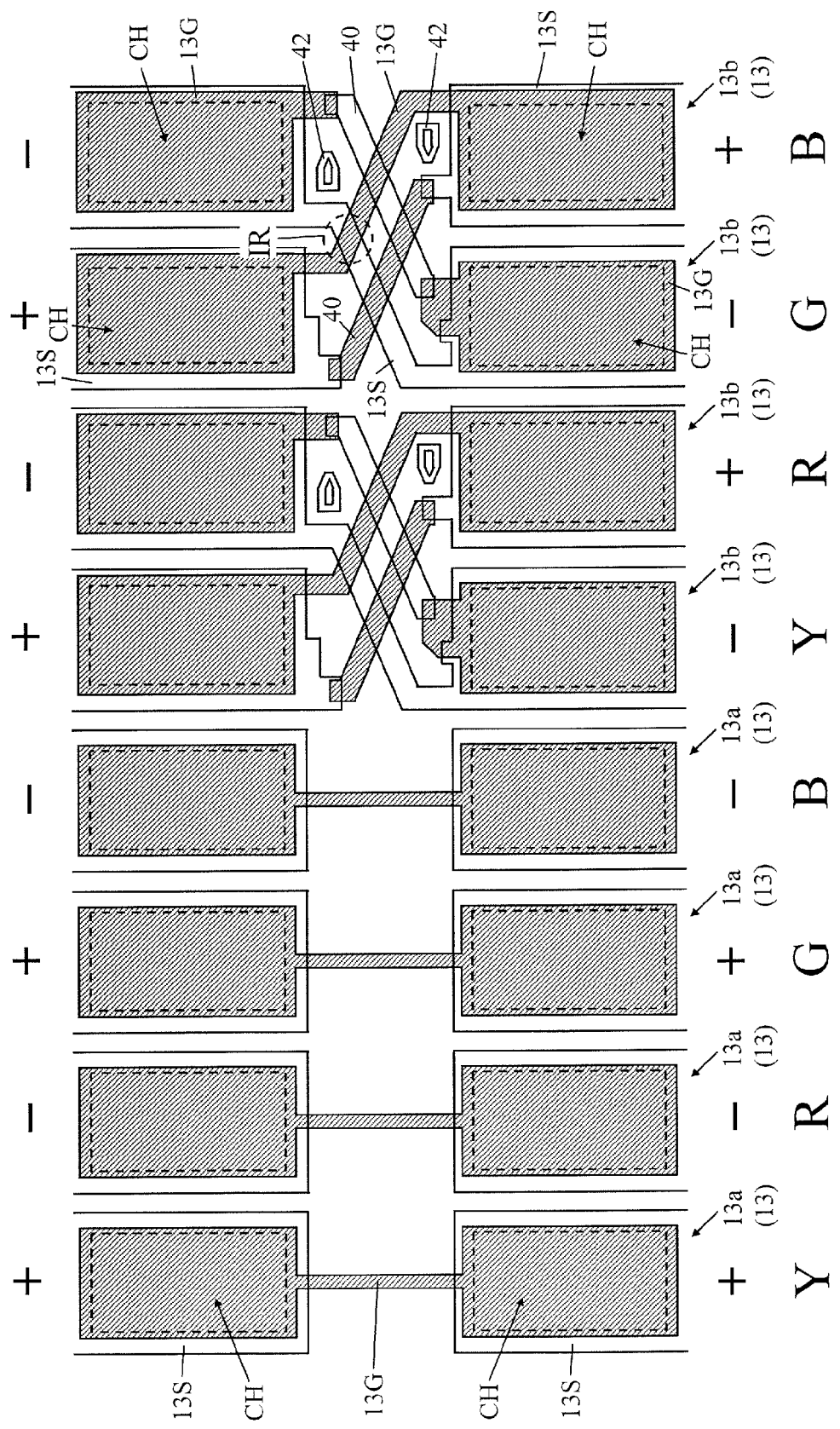
FIG. 9 is a plan view showing a part of the plurality of signal lines 13 included in the active matrix substrate 10, the part being located outside the display area.

As shown in FIG. 9, the active matrix substrate 10 of the liquid crystal display device 100 preferably includes markers 42 that points to the correction lines 40 respectively. Owing to such markers 42, the correction lines can be visually recognized easily for correcting the display fault. Thus, the lead time can be reduced.

In the example shown in FIG. 9, the markers 42 are formed of the source metal layer. Namely, the markers 42 are formed of the same conductive film as that of the part of the signal lines 13 which is located in the display area. Alternatively, the markers 42 may be formed of the gate metal layer. Namely, the markers 42 may be formed of the same conductive film as that of the part of the scanning lines 12 which is located in the display area. The markers 42 do not need to be formed of the gate metal layer or the source metal layer, but it is preferable that the markers 42 are formed of the same film as that of an existing element so that the markers 42 are formed with no extra process. For example, the markers 42 may be formed of the same film as that of a semiconductor layer of the TFT 14 (semiconductor film).

In the example shown in FIG. 9, the markers 42 have a pentagonal shape like a home plate of a baseball ground. The shape of the markers 42 is not limited to this. The markers 42 may have any shape which can point to the correction lines 40. For example, the markers 42 may be arrow-shaped or triangular.

Figure 10:
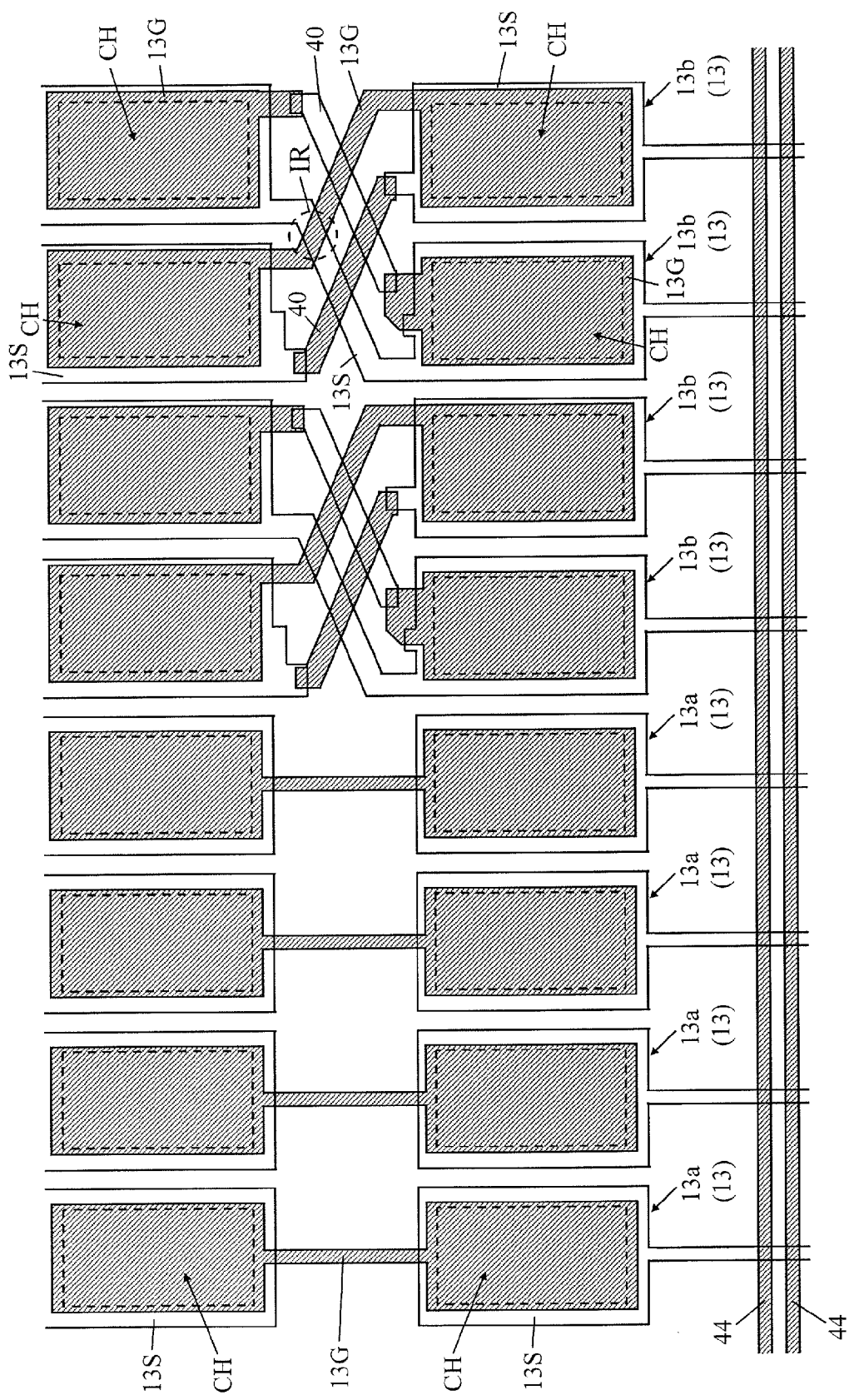
FIG. 10 is a plan view showing a part of the plurality of signal lines 13 included in the active matrix substrate 10, the part being located outside the display area.

As shown in FIG. 10, the active matrix substrate 10 preferably includes spare lines 44 for correcting a display fault caused by disconnection of any of the signal lines 13 in the display area. The spare lines 44 are formed of the gate metal layer, and in the area shown in FIG. 10, extend in the row direction. In the example shown in FIG. 10, two spare lines 44 are provided. Each of the spare lines 44 intersects the plurality of signal lines 13 in the state where the gate insulating film 16 is interposed therebetween.

Figure 11:
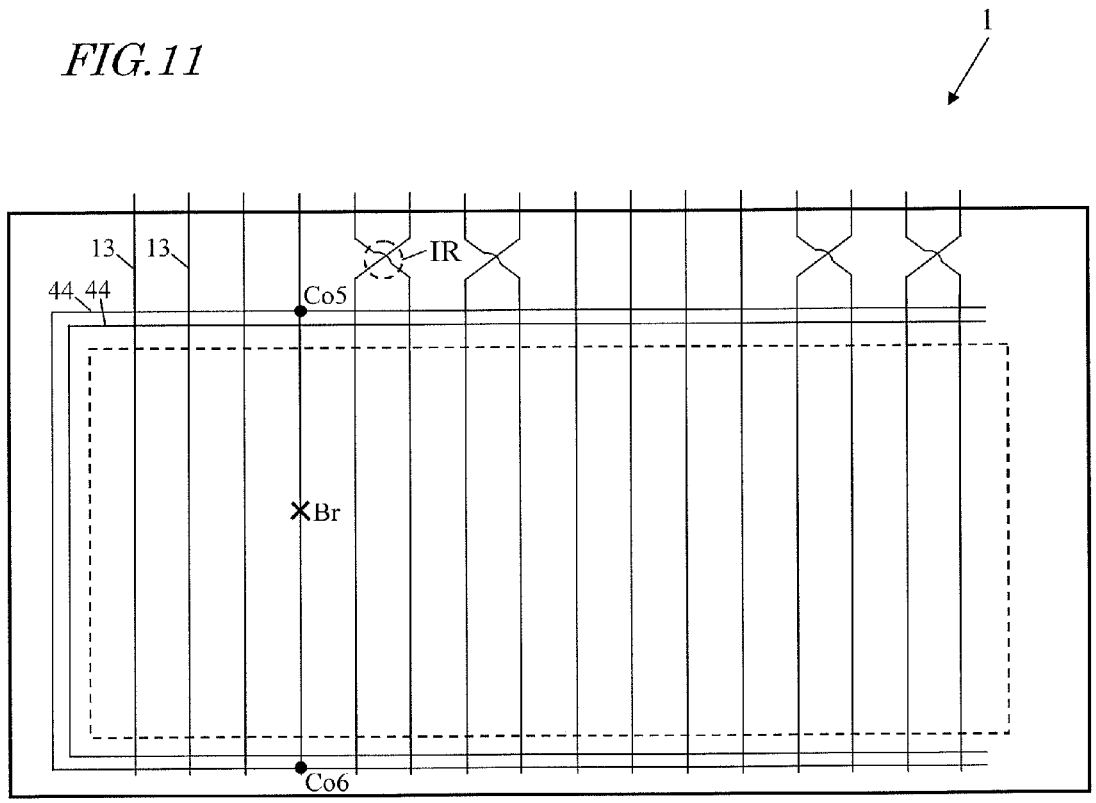
FIG. 11 shows an extending pattern of spare lines 44 included in the active matrix substrate 10.

FIG. 11 shows a drawing pattern of the spare lines 44 in the entirety of the liquid crystal display panel 1. As shown in FIG. 11, the spare lines 44 are drawn in a generally C-shaped pattern outside the display area (i.e., in a frame area). For example, in the case where the fourth signal line 13 in FIG. 11 is disconnected at a position Br in the display area, the pixels downstream with respect to the position Br are not supplied with a display signal. In this case, the disconnected signal line 13 and one of the spare lines 44 are connected to each other at two positions, namely, at one position in an upper part of the frame area and one position in a lower part of the frame area (connection parts Co5 and Co6). Owing to this, the pixels downstream with respect to the disconnection position Br are supplied with a display signal via the spare line 44.

As shown in FIG. 10 and FIG. 11, the spare lines 44 are located downstream with respect to the intersection regions IR. Therefore, when shortcircuiting occurs in any of the intersection regions IR, the display fault cannot be corrected by use of the spare lines 44. Even if a part of the spare lines 44 (part located in the upper part of the frame area) is provided upstream with respect to the intersection regions IR, when shortcircuiting occurs at positions of a number exceeding the total number of the spare lines 44, correction cannot be made on all the pixel columns exhibiting a display fault. However, in the liquid crystal display device 100 in this embodiment, the correction lines 40 are provided in the vicinity of the intersection regions IR. Owing to this, even if shortcircuiting occurs in many intersection regions IR, all the display faults caused by the shortcircuiting can be corrected.

In the above, the case where one color display pixel CP includes four pixels has been described. The present invention is not limited to this. The present invention is widely applicable to liquid crystal display devices in which each color display pixel CP includes n number of pixels (n is an even number of 4 or greater). For example, as in a liquid crystal display device 100A shown in FIG. 12, each color display pixel CP includes six pixels. In the liquid crystal display device 100A shown in FIG. 12, each color display pixel CP includes a cyan pixel C for displaying cyan and a magenta pixel M for displaying magenta in addition to the red pixel R, the green pixel G, the blue pixel B and the yellow pixel Y.

The types of the pixels (combination of the pixels) included in each color display pixel CP are not limited to those of the above-described examples. For example, in the case where each color display pixel CP includes four pixels, each color display pixel CP may include a red pixel R, a green pixel G, a blue pixel B and a cyan pixel C, or a red pixel R, a green pixel G, a blue pixel B and a magenta pixel M. As in a liquid crystal display device 100B shown in FIG. 13, each color display pixel CP may include a red pixel R, a green pixel G, a blue pixel B and a white pixel W. In the liquid crystal display device 100B, in an area of the color filter layer of the counter substrate 20 corresponding to the white pixel W, a colorless and transparent color filter (i.e., color filter transmitting white light) is provided. In the liquid crystal display device 100B shown in FIG. 13, the added color is white. Therefore, the effect of broadening the color reproduction range is not provided, but the display luminance of the entirety of one color display pixel CP can be raised.

Figure 12:
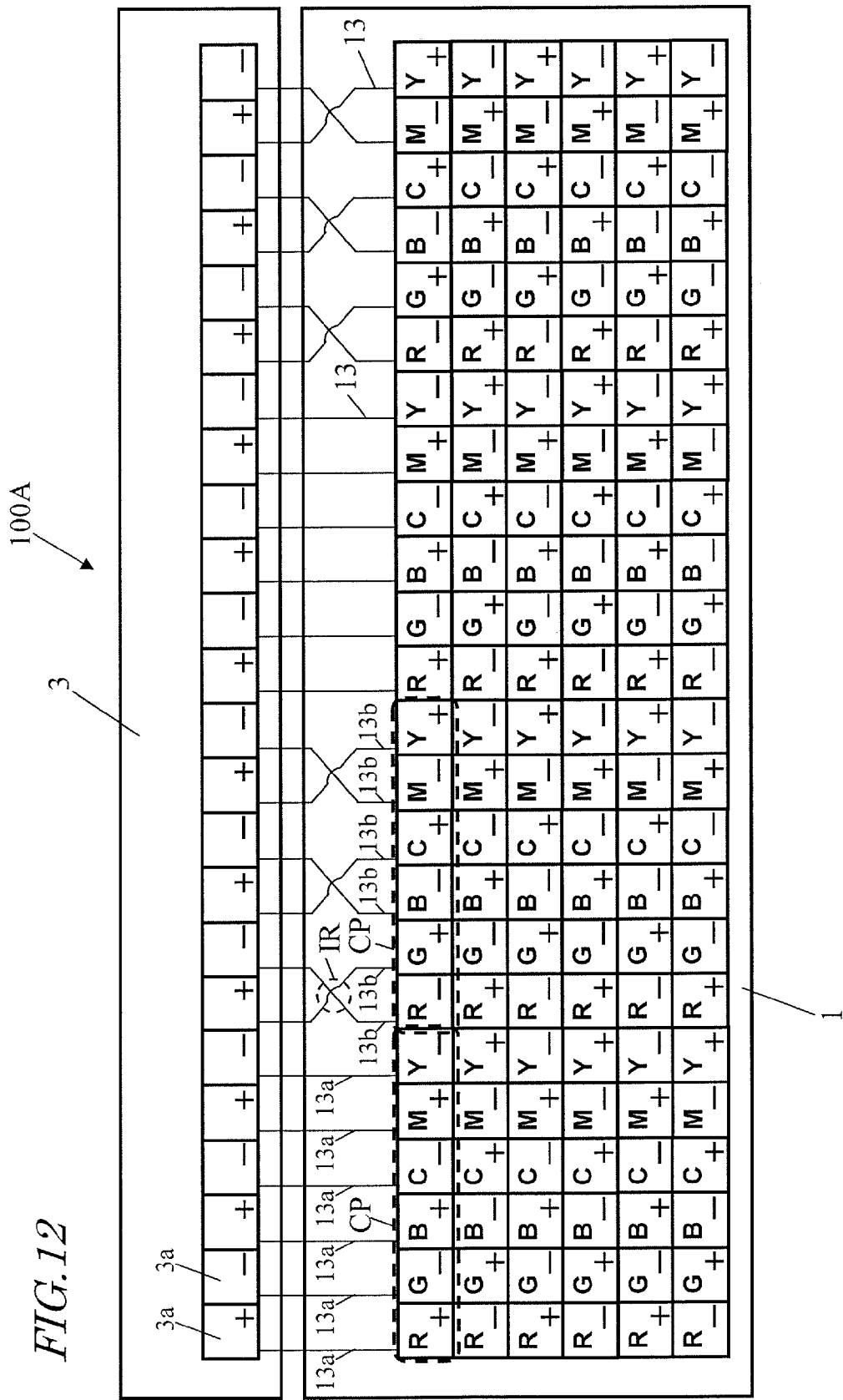
FIG. 12 schematically shows a liquid crystal display device 100A in a preferable embodiment according to the present invention.
Figure 13:
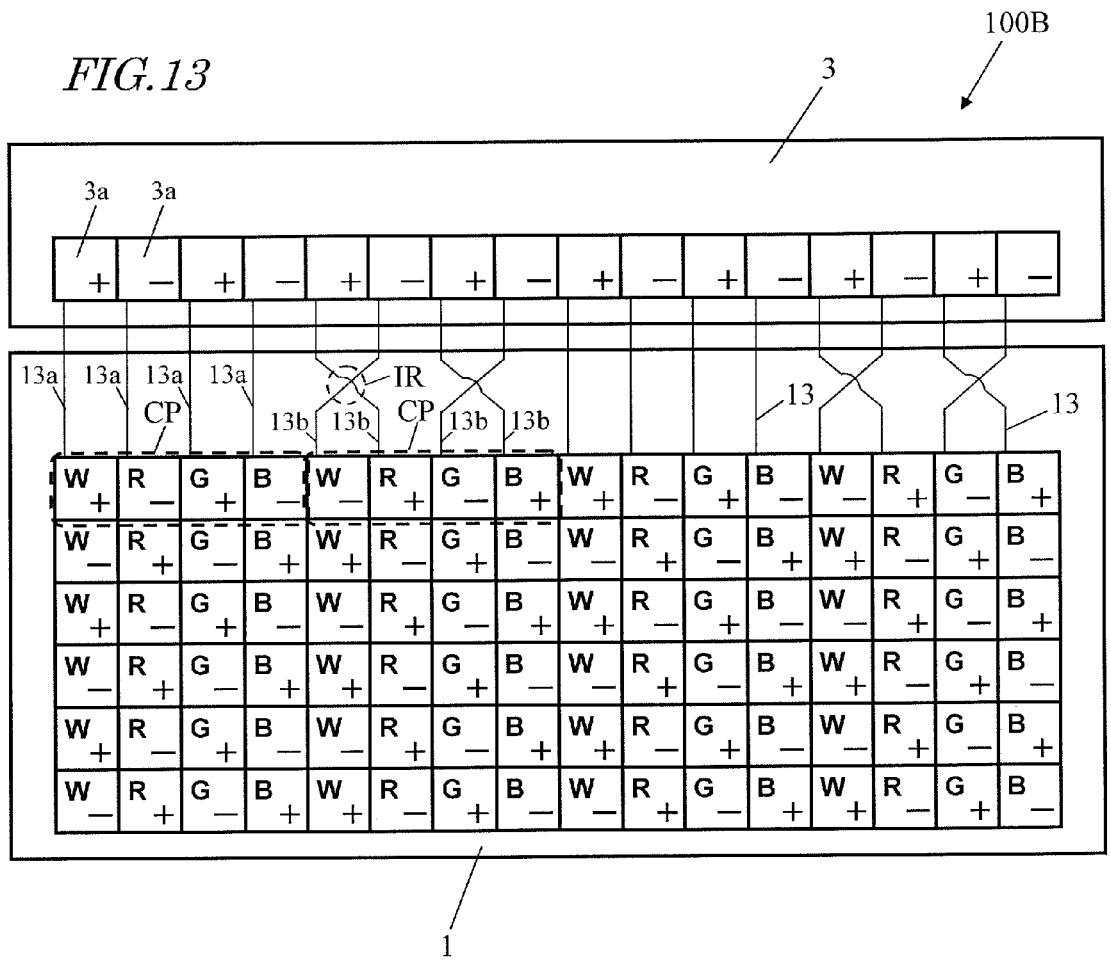
FIG. 13 schematically shows a liquid crystal display device 100B in a preferable embodiment according to the present invention.
Figure 14:
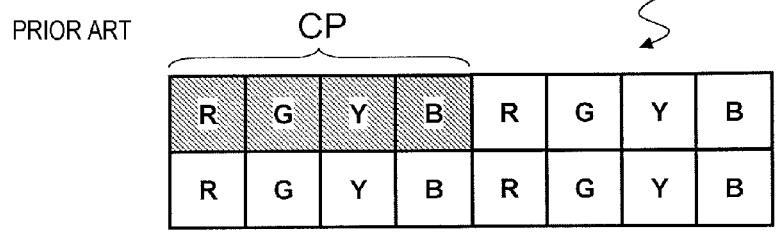
FIG. 14 schematically shows a conventional liquid crystal display device 800.
Figure 20:
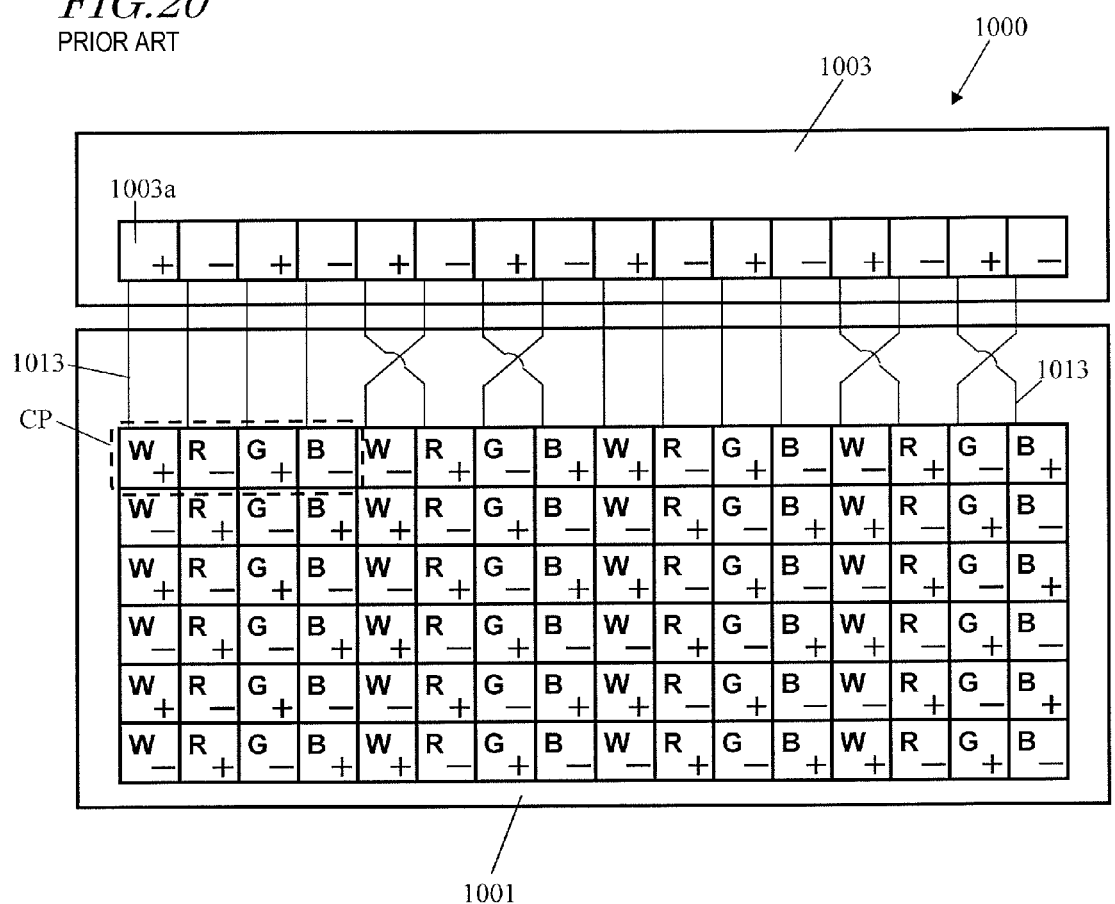
FIG. 20 schematically shows a conventional liquid crystal display device 1000.

The arraying order of the pixels in each color display pixel CP is not limited to that of the example shown in FIG. 4, FIG. 12, FIG. 13 or the like. For example, in the case where each color display pixel CP includes a red pixel R, a green pixel G, a blue pixel B and a yellow pixel Y, in the example shown in FIG. 4, the four pixels are located in the order of the yellow pixel Y, the red pixel R, the green pixel G and the blue pixel B from left to right in each color display pixel CP. Alternatively, any other arraying manner may be adopted. For example, the four pixels may be located in the order of the red pixel R, the green pixel G, the blue pixel B and the yellow pixel Y from left to right in each color display pixel CP.

In the structures shown in FIG. 4, FIG. 12 and FIG. 13, n number of pixels are arrayed in one row by n columns in the color display pixel CP, and the color filters are provided in a so-called stripe array. The present invention is not limited to this. It is sufficient that n number of pixels are arrayed in p rows by q columns (p is an integer of 1 or greater, and q is an even number of n or smaller) in the color display pixel CP. Namely, it is sufficient that the plurality of pixels are arrayed such that an even number of (q number of) pixels, among the n number of pixels included in the color display pixel CP and arrayed in the row direction, are repeated in the same order. For example, in the case where each color display pixel CP includes four pixels, the four pixels may be arrayed in 2 rows by 2 columns in the color display pixel CP. In the case where each color display pixel CP includes six pixels, the six pixels may be arrayed in 3 rows by 2 columns in the color display pixel CP.

In the above, the n number of pixels included in one color display pixel CP display different colors from each other. The present invention is not limited to this. The n number of pixels included in one color display pixel CP may include a plurality of pixels for displaying the same color (e.g., two red pixels R for displaying red).

INDUSTRIAL APPLICABILITY

According to the present invention, in a liquid crystal display device in which a color display pixel includes pixels of an even number of 4 or greater, the generation of a horizontal shadow can be prevented and the reduction of yield can be suppressed. The present invention is preferably usable for multiple primary color display devices. A liquid crystal display device according to the present invention is preferable usable as a display section of a TV receiver.

REFERENCE SIGNS LIST

1 Liquid crystal display panel
2 Scanning line driving circuit (gate driver)
3 Signal line driving circuit (source driver)
3a Output terminal
10 Active matrix substrate
10a, 20a Transparent substrate
11 Pixel electrode
12 Scanning line
13 Signal line
13a First type of signal line
13b Second type of signal line
13G Lower layer line
13S Upper layer line
14 Thin film transistor (TFT)
15 Storage capacitance line
15a Storage capacitance counter electrode
16 Gate insulating film
17 Storage capacitance electrode
18 Interlayer insulating film
19, 29 Alignment layer
20 Counter substrate
21 Counter electrode
30 Liquid crystal layer
40 Correction line
40a One end of the correction line
40b The other end of the correction line
42 Marker
44 Spare line
100, 100A, 100B Liquid crystal display device
CP Color display pixel
R Red pixel
G Green pixel
B Blue pixel
C Cyan pixel
M Magenta pixel
Y Yellow pixel
W White pixel
IR Intersection region
CH Contact hole

The invention claimed is:

1. A liquid crystal display device, comprising a plurality of pixels arrayed in a matrix including a plurality of rows and a plurality of columns, n number of the pixels (n is an even number of 4 or greater) being included in each of color display pixels, the liquid crystal display device comprising:
   an active matrix substrate including a plurality of scanning lines extending in a row direction and a plurality of signal lines extending in a column direction; and
   a signal line driving circuit that supplies, as a display signal, a gray scale voltage of a positive or negative polarity to each of the plurality of signal lines; wherein:
   the n number of pixels are arrayed in p rows by q columns (p is an integer of 1 or greater, and q is an even number of n or smaller) in each of the color display pixels;
   the plurality of signal lines include a first type of signal line which does not intersect another signal line, and a second type of signal line which intersects a signal line adjacent thereto outside a display area in a state where an insulating film is interposed therebetween;
   the active matrix substrate further includes a correction line which is provided in the vicinity of an intersection region where the second type of signal line intersects the adjacent signal line, is electrically separated from the plurality of signal lines, and is at a floating potential;
   the correction line is provided so as to partially overlap the second type of signal line as seen in a direction normal to the substrate;
   the correction line is formed of a conductive film same as that of a part of the plurality of scanning lines which is located in the display area or formed of a conductive film same as that of a part of the plurality of signal lines which is located in the display area;
   the correction line includes a first correction line portion defined by one of a pair of the second type of signal lines that intersect with each other that is made from a source metal layer and a second correction line portion defined by another one of the pair of the second type of signal lines that intersect with each other that is made from a gate metal layer;
   each of the plurality of signal lines which is outside of the display area includes a lower layer line made of the gate metal layer and an upper layer line made of the source metal layer; and
   the first correction line portion partially overlaps the lower layer line and the second correction line portion partially overlaps the upper layer line.

2. The liquid crystal display device of claim 1, wherein the active matrix substrate further includes a marker that points to the correction line.

3. The liquid crystal display device of claim 2, wherein:
   the active matrix substrate includes a thin film transistor provided in each of the plurality of pixels; and
   the marker is formed of the conductive film same as that of the part of the plurality of scanning lines which is located in the display area, formed of the conductive film same as that of the part of the plurality of signal lines which is located in the display area, or formed of a semiconductor film same as that of a semiconductor layer of the thin film transistor.

4. The liquid crystal display device of claim 1, wherein the n number of pixels included in one of any two color display pixels adjacent to each other in the row direction are each supplied with a gray scale voltage via the first type of signal line, and the n number of pixels included in the other of the any two color display pixels are each supplied with a gray scale voltage via the second type of signal line.

5. The liquid crystal display device of claim 1, wherein the plurality of pixels are arrayed such that the q number of pixels, among the n number of pixels included in the color display pixels arrayed in the row direction, are repeated in the same order.

6. The liquid crystal display device of claim 1, wherein:
the signal line driving circuit includes a plurality of output terminals arrayed in the row direction; and
any two output terminals adjacent to each other, among the plurality of output terminals, output gray scale voltages of opposite polarities to each other.

7. The liquid crystal display device of claim 1, wherein in any two color display pixels adjacent to each other in the row direction, the pixels for displaying the same color are supplied with gray scale voltages of opposite polarities to each other via the signal lines corresponding thereto.

8. The liquid crystal display device of claim 1, wherein any two pixels adjacent to each other in the row direction in each of the color display pixels are supplied with gray scale voltages of opposite polarities to each other via the signal lines corresponding thereto.

9. The liquid crystal display device of claim 1, wherein the n number of pixels included in each of the color display pixels display different colors from each other.

10. The liquid crystal display device of claim 1, wherein the n number of pixels included in each of the color display pixels include a red pixel for displaying red, a green pixel for displaying green, a blue pixel for displaying blue, and a yellow pixel for displaying yellow.

11. A display fault correction method for correcting a display fault in the liquid crystal display device of claim 1, the method comprising:
step (A) of specifying, from the plurality of signal lines, the second type of signal line shortcircuited to a signal line adjacent thereto in the intersection region; and
step (B) of forming a bypass circuit by use of the correction line such that a display signal to be supplied to the specified second type of signal line bypasses the intersection region.

12. The display fault correction method of claim 11, wherein the step (B) includes:
step (B1) of cutting the specified second type of signal line at a position upstream with respect to the intersection region and a position downstream with respect to the intersection region; and
step (B2) of connecting a part of the specified second type of signal line and one of two ends of the correction line to each other, and connecting another part of the specified second type of signal line and the other of the two ends of the correction line to each other.

13. The display fault correction method of claim 12, wherein the step (B1) and the step (B2) are performed by laser light radiation.

* * * * *